United States Patent [19]

Mann

[11] Patent Number: 5,718,740
[45] Date of Patent: Feb. 17, 1998

[54] PLUNGER ASSEMBLY FOR A GLASSWARE FORMING MACHINE

[75] Inventor: Philip Arnold Mann, Pontefract, United Kingdom

[73] Assignee: Emhart Glass Machinery Investments Inc., Wilmington, Del.

[21] Appl. No.: 708,169

[22] Filed: Aug. 16, 1996

[30] Foreign Application Priority Data

Aug. 31, 1995 [GB] United Kingdom ............ 9517920

[51] Int. Cl.⁶ .................... C03B 9/00; C03B 11/00
[52] U.S. Cl. .................... 65/171; 65/229; 65/261; 65/300; 65/305; 65/362
[58] Field of Search .................... 65/167, 171, 173, 65/229, 246, 261, 300, 305, 320, 361, 362

[56] References Cited

U.S. PATENT DOCUMENTS

| | | |
|---|---|---|
| 2,755,597 | 7/1956 | Rowe ............ 65/167 |
| 3,190,188 | 6/1965 | Donnelly ............ 65/305 |
| 3,231,355 | 1/1966 | Donnelly ............ 65/167 |
| 3,314,775 | 4/1967 | De Shetler et al. ............ 65/173 |
| 3,323,891 | 6/1967 | Donnelly ............ 65/246 |
| 3,585,016 | 6/1971 | Heyne et al. ............ 65/320 |
| 4,272,273 | 6/1981 | Trahan et al. ............ 65/167 |
| 4,609,393 | 9/1986 | Boutier ............ 65/229 |
| 5,334,233 | 8/1994 | Kozora ............ 65/362 |
| 5,411,564 | 5/1995 | Bolin ............ 65/171 |

FOREIGN PATENT DOCUMENTS 0761611  3/1997  European Pat. Off. .

*Primary Examiner*—Steven P. Griffin
*Attorney, Agent, or Firm*—Spencer T. Smith

[57] ABSTRACT

A plunger assembly for a glassware forming machine is readily convertible between, for example, double and triple gob configurations and between press and blow and blow and blow operation. A framework is provided with a replaceable positioning plate with recesses corresponding to the required number of cylinders, and air connections are provided which, when the cylinders are in position, provide the necessary operating air.

2 Claims, 7 Drawing Sheets

PLUNGER ASSEMBLY FOR A GLASSWARE FORMING MACHINE

FIELD OF THE INVENTION

The present invention relates to a plunger assembly for use in a glassware forming machine of the I.S type which comprises a plurality of similar sections arranged side by side and operating simultaneously. In such a section a parison is formed from a gob of molten glass in a parison mould at a blank station on the machine, and is then transferred to a blow mould at a blow station at which it is formed into a final container. There are three main processes by which the parison is formed, namely blow and blow, press and blow and narrow neck press and blow, and all three require the use of a plunger to form a cavity in the glass in the parison mould—in the blow and blow process this is a small cavity which is subsequently enlarged by a blowing operation to form the parison, and in the press and blow, and narrow neck press and blow processes it is a larger cavity which is only enlarged by blowing when the parison is in its blow mould.

Glassware forming machines of the I.S type may be adapted for use with one, two, three or four moulds at each blank station and each blow station, ie single, double, triple or quadruple gob operation.

To be able to utilise the machine to its fullest possible capacity it must be possible, not only to change the machine from one method of parison formation to another, but also to change the number of gobs operated upon. Such changes can be very time consuming, especially where changing the number of plungers is concerned. A typical change might be between 4¼" Triple Gob operation and 6¼" Double Gob operation.

BACKGROUND TO THE INVENTION

U.S. Pat. No. 5,411,564 shows a plunger assembly in which a set of plunger cylinders are mounted side by side between two mirror image locating members. One type of plunger cylinder can, in this construction, readily be replaced by another, but if a change from double gob to triple gob operation is required, the whole plunger assembly must be exchanged.

It is one of the objects of the present invention to provide an improved plunger assembly which can conveniently be changed to operate on different numbers of gobs.

The present invention provides a plunger assembly for use in a glassware forming machine and comprising up to N parison plungers comprising a framework means for locating a replaceable positioning plate in said framework N sets of pneumatic connections extending through said framework means for securing a replaceable clamping plate to said framework N wherein when the assembly is arranged for use with M plungers (where N≧M≧1)

a replaceable positioning plate is selected having M locating recesses and is located in said framework M plunger operating cylinders are located one in each of the locating recesses in the positioning plate a replaceable clamping plate is selected having M locating apertures and is secured to the framework with one of said plunger operating cylinders located in each aperture to clamp the cylinders against the positioning plate each of the M plunger operating cylinders when clamped in position being connected to one set of pneumatic connections in the framework, the N-M unused pneumatic connections being blanked off by the plunger operating cylinders or the positioning plate.

There now follows a description, to be read with reference to the accompanying drawings, of a plunger assembly embodying the invention.

BRIEF DESCRIPTION OF THE DRAWINGS

In the accompanying drawings

DESCRIPTION OF THE PREFERRED EMBODIMENT

Figure 1:
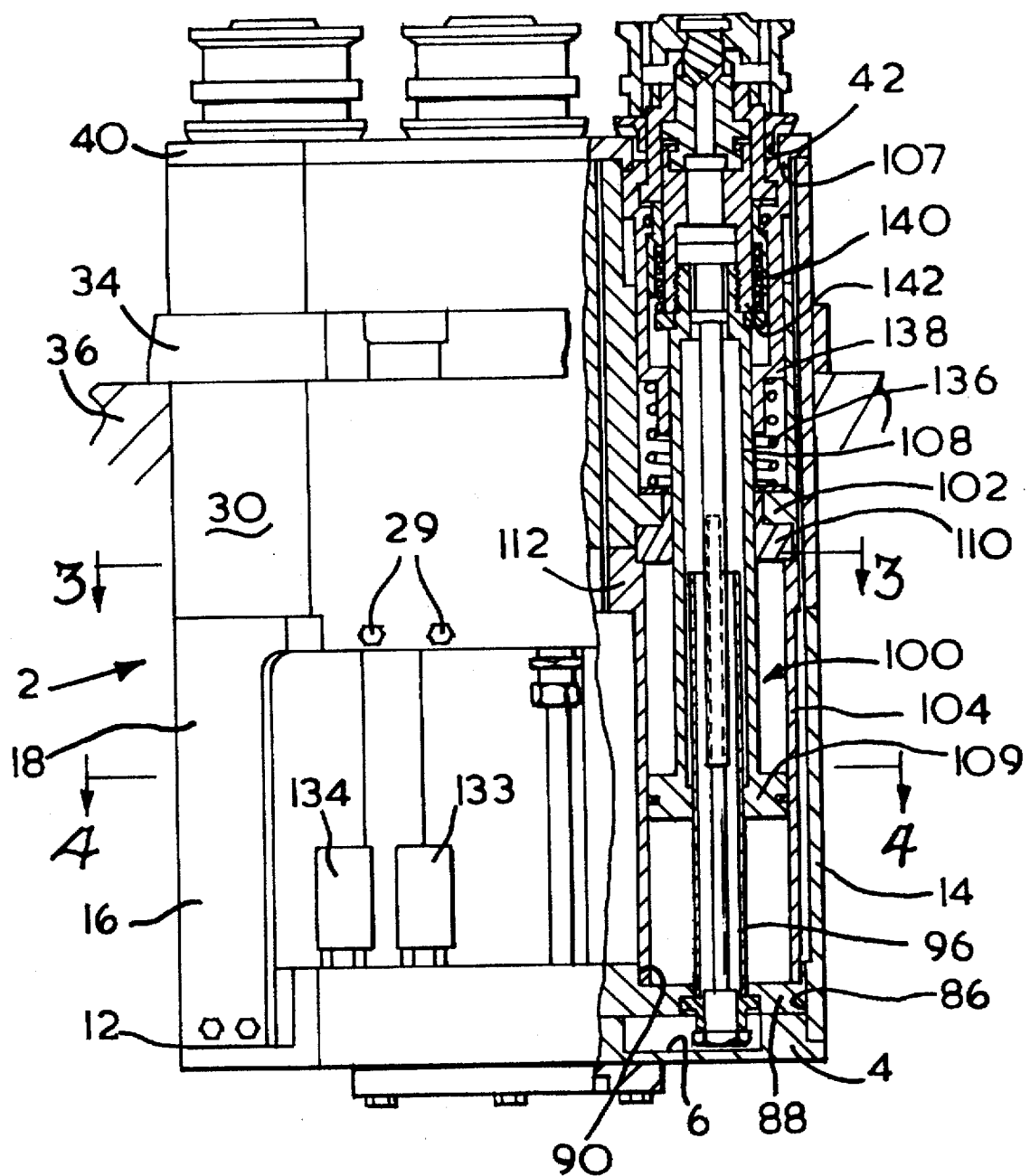
FIG. 1 shows a side view, partly in section, of a plunger assembly comprising three plunger operating cylinders adapted for blow and blow operation
Figure 5:
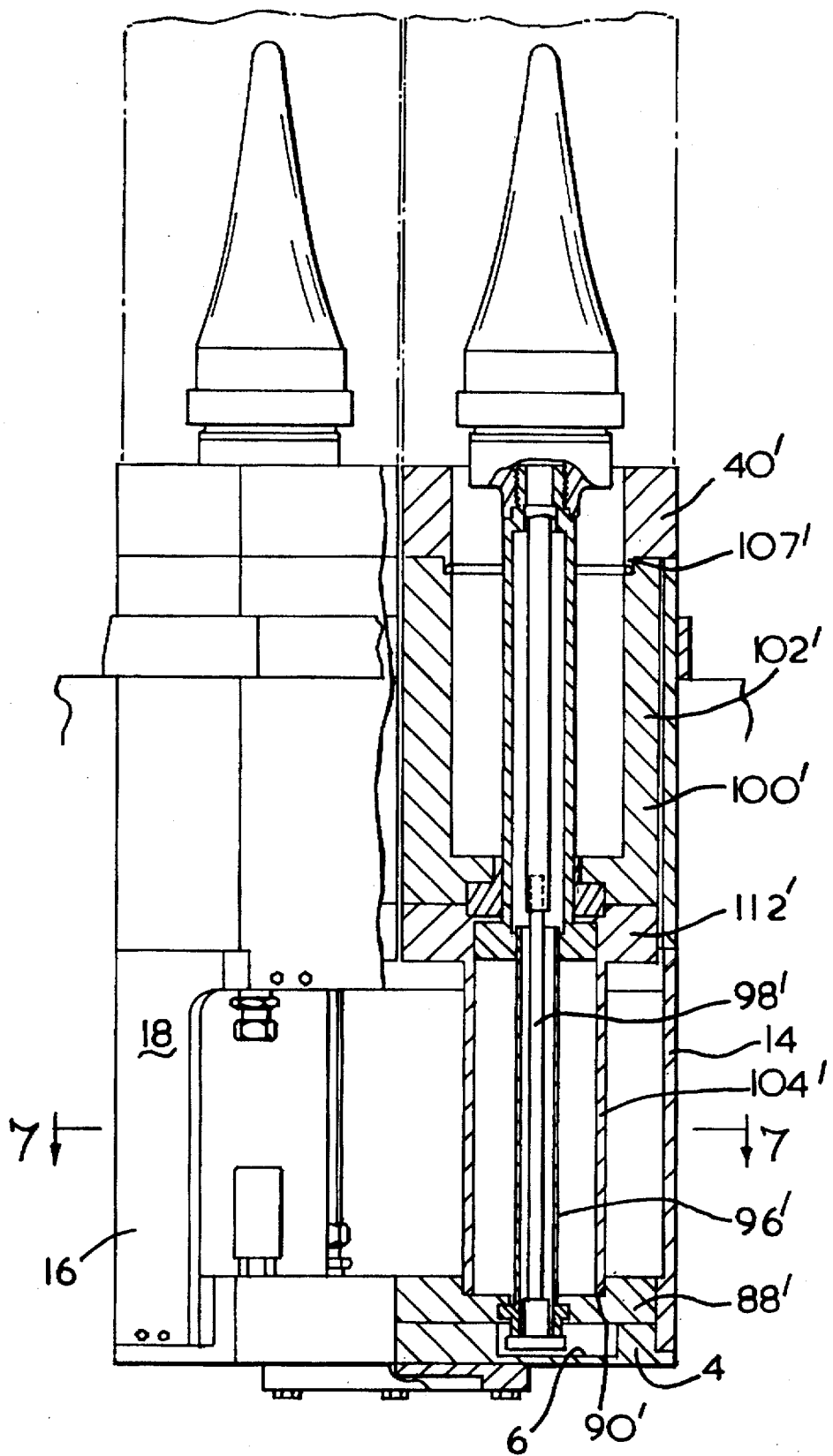
FIG. 5 shows a side view, partly in section, of the plunger assembly comprising two plunger operating cylinders adapted for press and blow operation

A plunger assembly is shown in the drawings which is adapted for use in a glassware forming machine of the I.S type in conjunction with parison moulds of the machine. The assembly as shown in FIG. 1 comprises three parison forming plungers and three plunger operating cylinders and is intended for 4¼" Triple Gob Blow and Blow operation. FIG. 5 shows the plunger assembly as intended for 6¼" Double Gob press and blow operation, comprising two parison forming plungers and two plunger operating cylinders.

It will be understood that, as shown, the assembly is one comprising up to N (specifically 3) parison plungers, and can be arranged for use with M (specifically 2 or 3) plungers where N≧M≧1. The assembly comprises a framework 2, means provided by a recess 86 for locating a replaceable positioning plate 88 or 88' in the framework, three sets of pneumatic connections extending through the framework, means for securing a replaceable clamping plate 40 or 40' to the framework, wherein when the assembly is arranged for use with 3 plungers [see FIG. 1] a positioning plate 88 which has three recesses (90,92,94) is selected and is located in the framework, 3 plunger cylinders 100 are located one in each of the recesses 90,92 and 94 of the positioning plate 88, a clamping plate 40 is selected which has 3 locating apertures 42,44 and 46 and is secured to the framework with one plunger cylinder 100 located in each aperture to clamp the cylinder 100 against the positioning plate. When the assembly is arranged for use with 2 plungers (see FIG. 5) a positioning plate 88' which has 2 recesses 90' and 94' is selected and is located in the framework, 2 plunger cylinders 100' are located, one in each of the recesses 90' and 94' of the positioning plate 88', a clamping plate 40' is selected which has two locating apertures 42' and 46' and is secured to the framework with one plunger cylinder 100' located in each aperture 42' 46' to clamp the cylinders 100' against the positioning plate.

As will become clear later, in the triple gob configuration each of the plunger cylinders 100 is connected, through its positions in the framework, to one of three sets of pneumatic connections in the framework; in the double gob configuration each of the plunger cylinders 100' is connected to one of the sets of pneumatic connections while the other set of pneumatic connections is blanked off by the plunger cylinders 100' or the positioning plate 88'.

Figure 8:
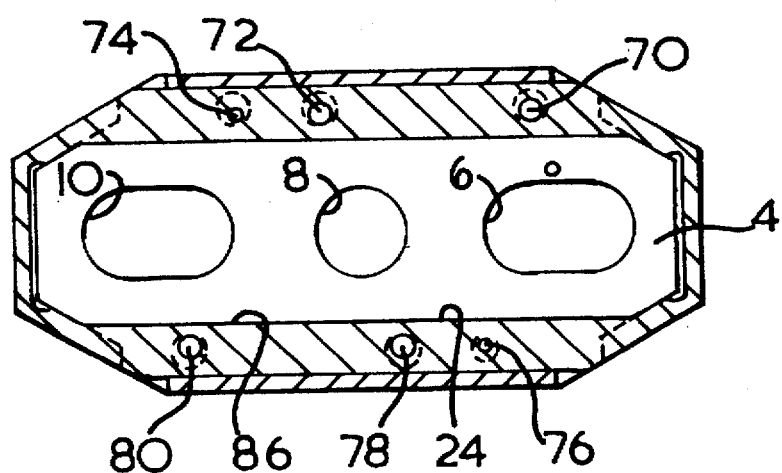
FIG. 8 shows a view corresponding to FIG. 3 with plunger cylinders omitted
Figure 12:
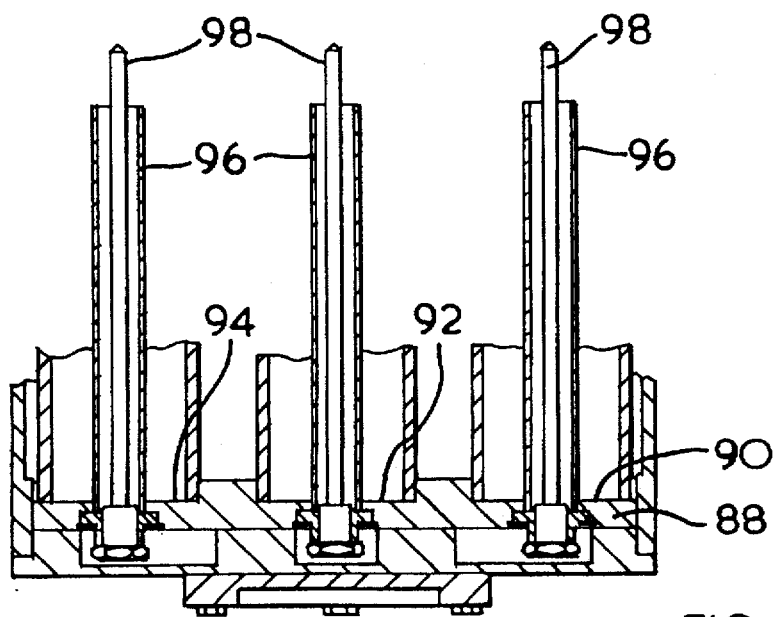
FIG. 12 shows a view of a lower part of FIG. 1 in section to show the positioning plate

The framework 2 of the assembly comprises a base 4 which is provided with three spaced recesses 6,8 and 10 [see FIGS. 8 & 12]. The recess 8 is circular, the recesses 6 and 10 which are equally spaced on either side of the recess 8 are oval.

Extending upwardly at opposite ends of the base 4 and secured to the base 4 by screws 12 are end walls 14,16 of a lower frame member 18. The lower frame member 18 also comprises side members 20,22 [see FIGS. 10 & 11] which connect the end walls 14 and 16 and provide, together with the end walls, an elongated opening 24.

Figure 10:
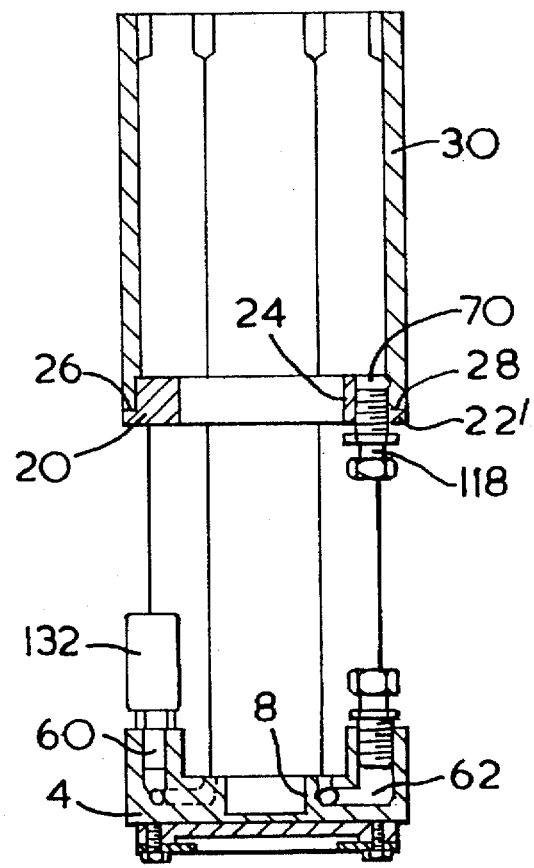
FIG. 10 shows a view taken along the line 10—10 of FIG. 9
Figure 11:
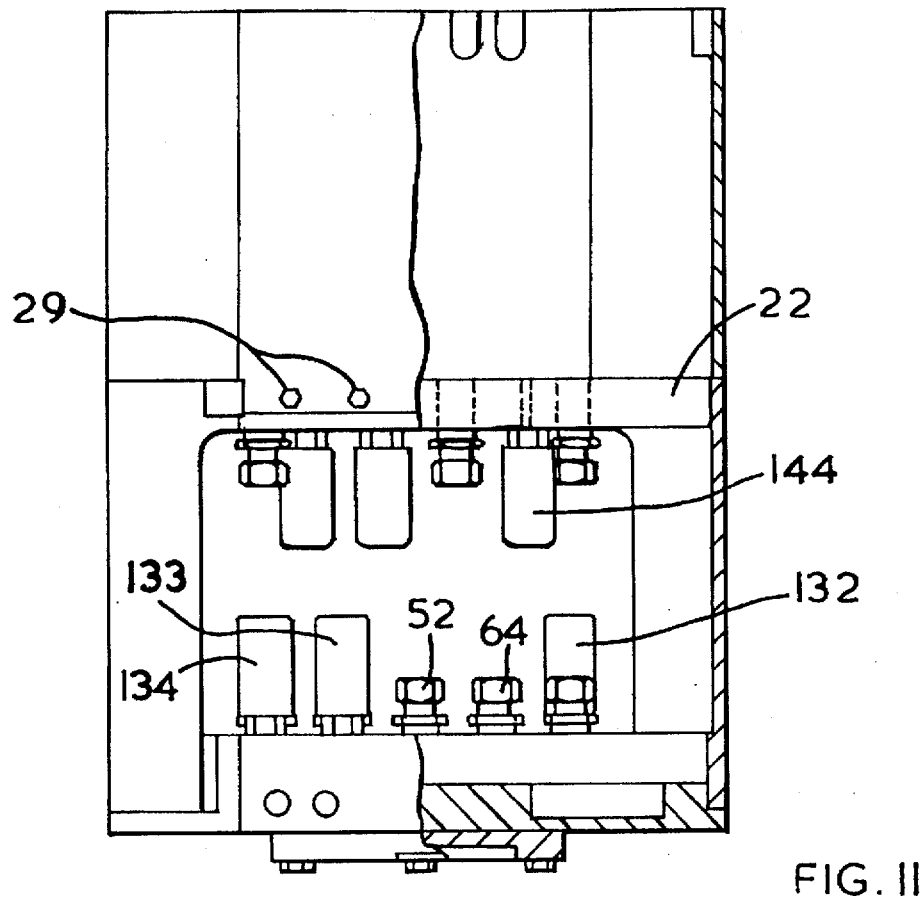
FIG. 11 shows a view corresponding to FIGS. 1 and 5 but with plunger cylinders omitted

The side members 20,22 are provided with parallel opposed ledges 26,28 [see FIG. 10]. Secured to these ledges by screws 29 are lower end portions of an upper frame member 30 which is in the form of a tube having an elongated opening 32 corresponding to, but somewhat larger than, the opening 24.

The upper frame member 30 is located in a locating ring 34 which is secured to a table 36 of a section of an I.S machine, and the assembly may be adjusted vertically in such ring by conventional height adjustment mechanism (not shown).

Figure 2:
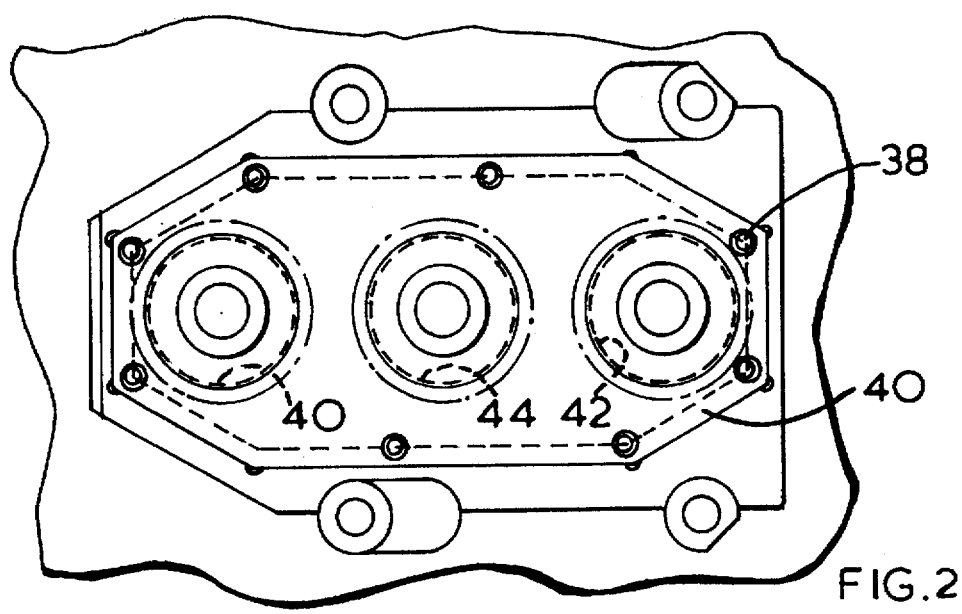
FIG. 2 shows a plan view of FIG. 1

The clamping plate, 40 which is (in the case of a triple gob plunger assembly) provided with the three locating apertures 42,44,46, is secured to the upper frame member 30 of the framework 2 by screws 38 (FIG. 2).

Figure 4:
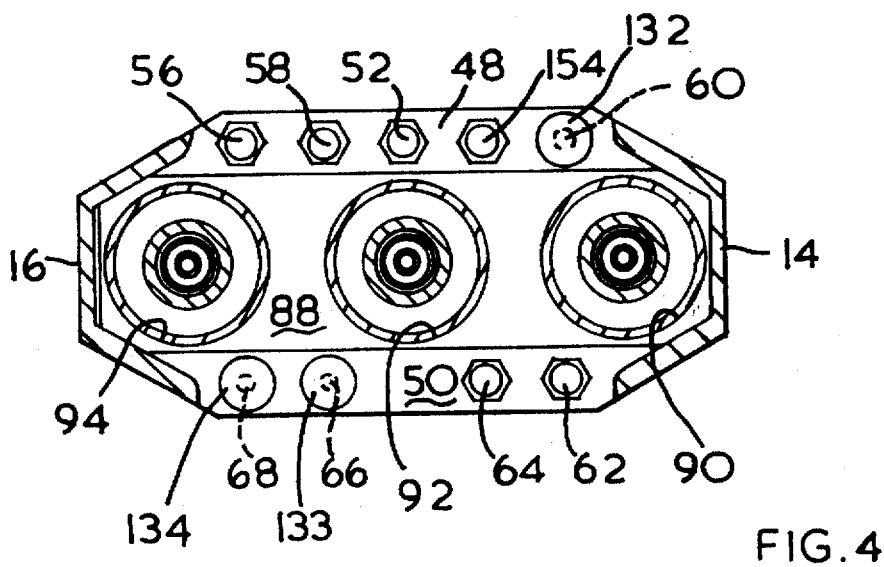
FIG. 4 shows a section along 4—4 of FIG. 1
Figure 9:
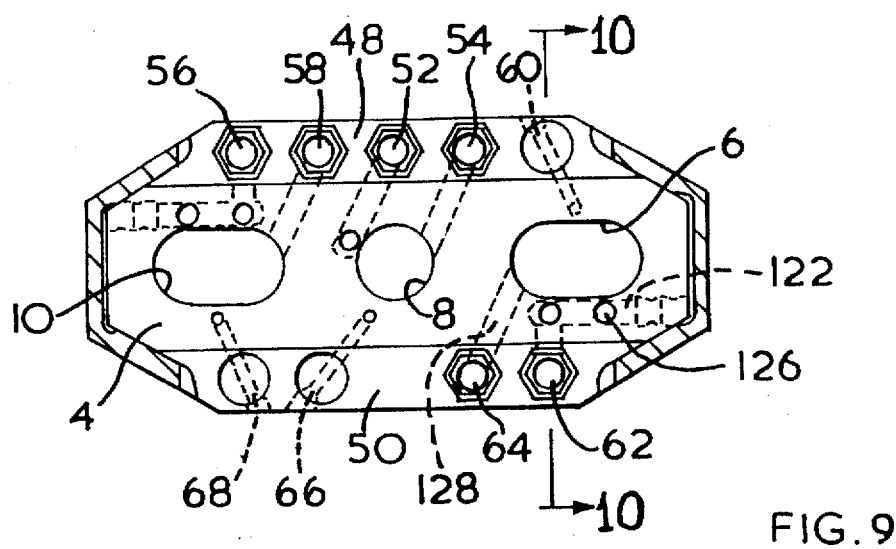
FIG. 9 shows a view corresponding to FIGS. 4 and 7 but with plunger cylinders and positioning plate omitted

The base 4 of the frame work 2 is provided with two opposed side walls 48,50 (FIGS. 4 and 9). The side wall 48 is provided with four operating air passages 52,54,56 and 58 and with one passage 60 for an air connection to a transducer 132. The side wall 50 is provided with two air passages 62,64 and with two passages 66, 68 for air connection to transducers, 133, 134. As will become apparent later, when the assembly is used for triple gob application blow and blow operation, a first plunger operating cylinder is provided with plunger up operating air from the passage 62, counter-blow air from the passage 64 and air connections to the pressure transducer 132 are provided through the passage 60. Similarly the second plunger cylinder is provided with operating air through passages 52 and 54 and with a connection to a transducer 133 through the passage 66, while the third cylinder is provided with operating air through passages 56 and 58 and connection to a transducer 134 through the passage 68.

Figure 3:
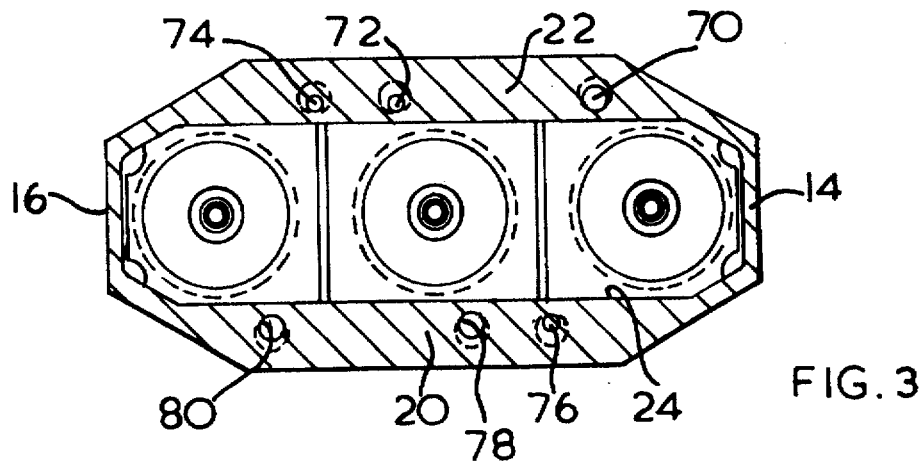
FIG. 3 shows a section along 3—3 of FIG. 1

Further connections for the cylinders are provided in the side members 20 and 22 of the lower frame member 18. The side member 22 is provided with an operating air passage 70 for the first cylinder, and transducer air connection passages 72,74 for the second and third cylinders respectively. The side member 20 is provided with a transducer air connection passage 76 for the first cylinder, and with operating air passages 78,80 for the second and third cylinders respectively (see FIG. 3).

FIG. 1 shows a plunger assembly adapted for triple gob, blow and blow operation. The parallel side walls 48,50 of the base together with the end walls 14 and 16 define the recess 86, in a bottom face of which the recesses 6, 8 and 10 are formed. Positioned in the recess 86 is a triple gob positioning plate 88. The positioning plate 88 comprises three spaced circular vertical recesses 90,92,94 and positioned centrally in each of the vertical recesses 90,92,94 secured by a retaining ring is a tube 96 (see FIG. 12) and, extending upward axially in the tube 96, a position transducer 98. Electrical leads (not shown) lead through the base plate 4 and make contact with leads from the transducer 98 when the cylinders are in position.

The three blow and blow plunger operating cylinders are positioned in the frame work 2 between the positioning plate 88 and the clamping plate 40. The three plunger cylinders 100 are substantially identical, are of generally conventional construction and will not be described in detail.

Figure 13:
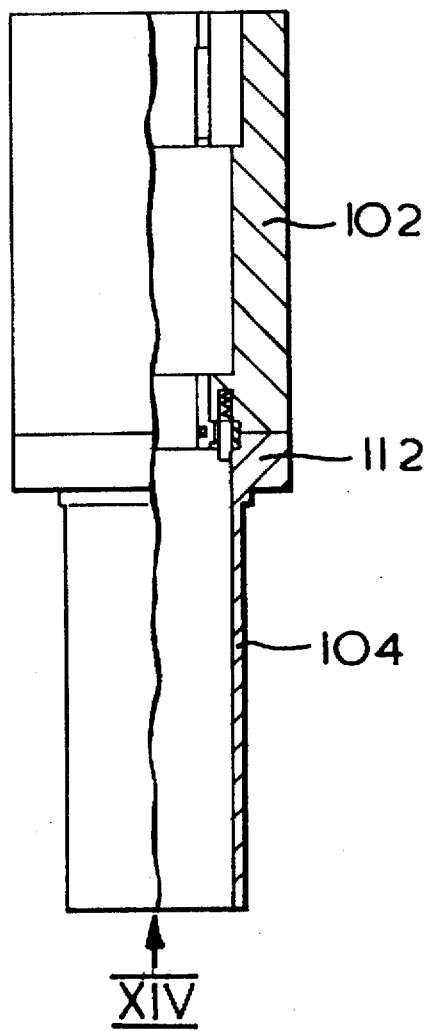
FIG. 13 shows a section through part of a press and blow plunger operating cylinder
Figure 14:
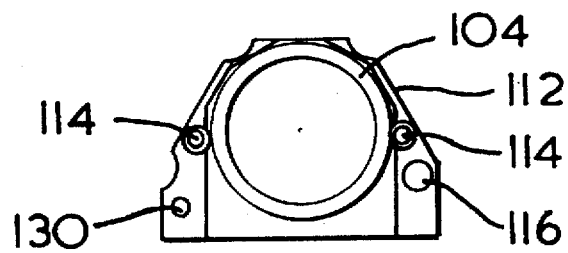
FIG. 14 shows a view of FIG. 13 in the direction of the arrow XIV.

A plunger operating cylinder 100 comprises an upper cylinder portion 102 and a lower cylinder portion 104 secured together by screws 114 (FIGS. 13 & 14). A lower end portion of the lower cylinder portion 104 fits closely into one of the recesses 90,92,94 while an upper end of the upper cylinder portion 102 fits around a corresponding annular ridge 107 on the outer face of the clamping plate 40.

An endmost plunger operating cylinder 100 will now be described (see FIG. 1).

The cylinder 100 is, as conventional, pneumatically operated, and the pneumatic operation is controlled by a servo pneumatic valve (not shown) generally as described in our co-pending application [PCT/GB94/00643]. Mounted for movement in the lower cylinder portion 104 is a piston 109 which is a close sliding fit on the tube 96. The piston 109 is attached to a tubular rod 108 which is slidably mounted in a bearing 110 which is secured between the upper and lower cylinder portions 102, 104.

The upper and lower cylinder portions 102,104 of the cylinder 100 are illustrated in FIGS. 13 and 14. The lower cylinder portion 104 comprises an upper flange 112 which is of polygonal outline and which can fit loosely into the opening 24 of the framework 2. The upper cylinder portion 102 is of the same cross section as the upper flange 112, and the two cylinder portions are secured together by the screws 114. A plunger down air operating port 116 leads upwardly from the underface of the flange 112, through a gap (not shown) provided between the flange 112 and a lower end surface of the upper cylinder portion 102, and opens into the bore of the lower cylinder portion 104 above the piston 109.

Each cylinder 100 is thus provided with air from one set of the pneumatic connections provided in the framework 2, and is connected to provide it with (a) plunger down air
(b) plunger up air
(c) counter blow air and
(d) air connections to two pressure sensors which are incorporated in a control circuit for the cylinder 100.

For the endmost cylinder 100:

(a) the plunger down air is provided from air supply (not shown) which leads to an air connector 118 (FIG. 10)

secured in the side member 22 which leads to the passage 70 in the side member 22 which opens onto the upper face of the side member 22. When the cylinder 100 is in position in the framework 2, the passage 70 faces the entry to the port 116.

(b) the plunger up operating air is provided from the air passage 62 in the side wall 50 (FIGS. 4 & 9). The passage 62 leads to a horizontal cranked air passage 122 formed in the base 4 which leads to two upwardly opening passages 124,126. When the assembly is used for triple gob operation, the passage 124 is blanked off by the positioning plate 88, while the passage 126 leads to a corresponding passage in the positioning plate (not shown) and opens into the interior of the cylinder portion 104 below the piston 109.

(c) the counter blow air is provided from the air passage 64, which leads to a horizontal air passage 128 leading to the recess 6. From here the air passes through passages in the base plate of the cooling tube 96 into the tube 96.

(d) the lower pressure sensor 132 and an upper pressure sensor 144 are in communication with the chambers formed above and below the piston 109. The upper sensor 144 is connected to the chamber above the piston 109 through a passage 130 in the upper flange 112 (FIGS. 3 & 14) which mates with the passage 76 in the side member 20. The lower pressure sensor 132 is connected, through a passage in positioning plate 88 and the passage 60 in the side wall 48, to the chamber below the piston 109.

The cylinder 100 is located in the plunger assembly solely by engagement of the lower cylinder portion 104 in the recess 90 of the positioning plate 88, and by engagement of the upper cylinder portion 102 with the ridge 107 in the clamping plate 40, and when it is in such position, as has been explained, direct contact is made for the supply of plunger down air, plunger up air, counter blow air and for air supply to the pressure sensors. The other two operating cylinders are generally similar to the cylinder 100, save that the central cylinder comprises an upper cylinder portion which is generally rectangular in cross section as is the upper flange of its lower cylinder portion.

As can be seen from FIG. 1, the mechanism of the operating cylinder 100 is of conventional construction.

Initially the plunger (not shown) is in its lowermost position, a spring 136 acting between a thimble member 138 and the bottom of the cylinder portion 102 is compressed, as is a spring 140 effectively acting between the thimble member 138 and a plug 142 which supports the plunger. Plunger down air maintains the piston 109 in this position.

Plunger down air is then switched off, allowing the spring 140 to assert itself to move the thimble member 138 upwards, while the spring 140 moves the plug 142 downwards with respect to the thimble 138.

Plunger up air is then switched on, pushing up the thimble member 138 and the plug 142, so that the plunger moves upwards which, in use of the mechanism creates a recess in the glass in the associated parison mould.

Plunger up air is then switched off, the plunger comes down, withdrawing from the glass to leave a recess to which counter blow air is provided to blow the parison into its required shape.

Plunger down air then brings the plunger and thimble down back to their initial positions.

It will be understood that the plunger assembly is associated with an appropriate control circuit incorporating the pressure sensors, to ensure the provision of the correct air supplies at the correct time.

Figure 6:
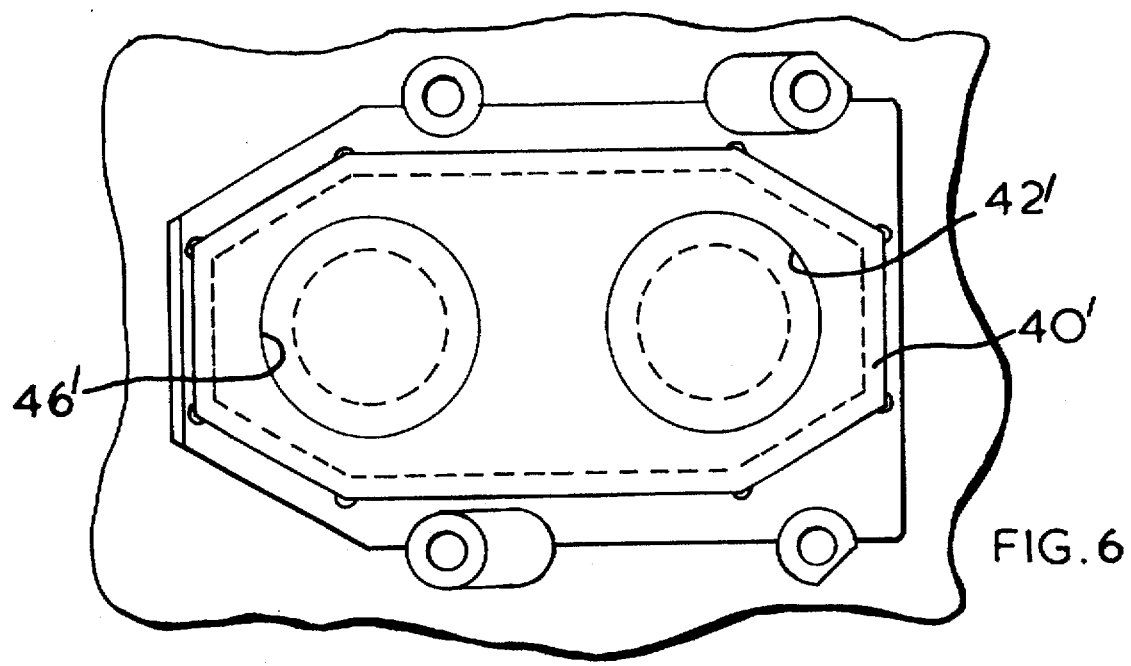
FIG. 6 shows a plan view of FIG. 5
Figure 7:
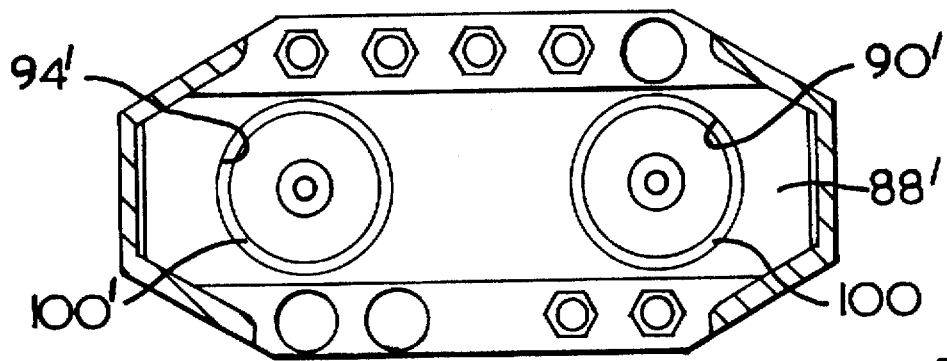
FIG. 7 shows a section along 7—7 of FIG. 5

FIGS. 5, 6 and 7 show the plunger assembly 2 as intended for 6¼" Double Gob Press and Blow operation, and comprise two parison forming plungers and two plunger operating cylinders 100'. It will be understood that, other than the plunger operating cylinder 100', most of the parts shown in FIG. 1 are also present in FIG. 5: those parts in FIG. 5 which are similar to, but not identical with, parts in FIG. 1 will be indicated by primed numerals.

To convert the plunger assembly 2 as shown in FIG. 1 to the assembly as shown in FIG. 5 the following steps are necessary.

Firstly, the clamping plate 40 is released and removed. The three cylinders 100 are lifted out of the frame work 2, as also is the positioning plate 88 carrying the three tubes 96.

Then the new positioning plate 88' is located in the recess 86. The plate 88' comprises two tubes 96' enclosing transducers 98' positioned centrally in two circular recesses 90',94'. The two plunger operating cylinders 100' are then located in the frame work 2, lower end portions of lower cylinders 104' of the operating cylinders 100' are located in the recesses 90',94' and the clamping plate 40', which comprises the two appropriate locating apertures 42',46' is then secured to the upper frame member 30 by the screws 38.

Annular ridges 107' on the underface of the clamping plate 40' fit into upper end portions of upper cylinder portions 102' of the two cylinder assemblies.

The upper cylinder portion 102' is of polygonal cross section, so that the two upper cylinder portions fit into the opening 24. The lower cylinder portions have an upper flange 112' which is of corresponding cross section to that of the upper cylinder portions, and which rests on the side members 20,22. It will be seen that the elongated shape of the recesses 6 and 10 in the base 4 are adapted to received the lower end portions of the tubes 96', while the positioning plate 88' blanks off the central recess 8.

Each of the two cylinder assemblies 100' is provided with air from one set of the pneumatic connections provided in the framework 2 and is connected to operating air supplies and to pressure transducers in substantially the same way as the endmost cylinder assembly 100 as previously described. The set of pneumatic connections which serve to connect to the central cylinder assembly 100 in the arrangement of FIG. 1 comprise means for supplying (a) plunger down air, which is provided through the passage 78 in the side member 20. This passage is closed off by the upper flange 112' of one of the cylinder assemblies 100'

(b) plunger up operating air which is provided through the air passage 52 which leads to an upwardly facing opening in the base 4 (see FIG. 9). This opening is closed off by the positioning plate 88'

(c) counterblow/cooling air, which is provided into the recess 8 from the air passage 54. This recess 8 is closed off the positioning plate 88'

(d) air to the lower pressure sensor, which is connected through a passage in the positioning plate 88: no comparable passage is provided in the plate 88', air to the upper pressure sensor, which is provided through the passage 72 in the side member 22 (see FIG. 3) which is blanked off by the upper flange 112' of one of the cylinder assemblies 100'.

Plunger up air is provided to the lower cylinder portion 104' through the upward passage 124 in the base 4 and through the positioning plate 88', which also blanks off the upward passage 126 which is utilised in the triple gob version.

It can thus be seen that the change over from triple gob version to double gob version requires no adjustment of the air supply arrangements, nor of the air supply to the transducers. Also, change from a blow and blow cylinder assembly, to a press and blow cylinder assembly requires no such adjustment.

The detailed construction and operation of the press and blow cylinder assembly 100' will not be described in detail—it is generally as disclosed in our co-pending [PCT/GB94/00643]application. The assembly comprises two pressure transducers, one connected to the space above and one connected to the space below the piston 109', and a position transducer, and through a control circuit, plunger up pressure is applied, as determined by the position transducer, until the piston 109 has moved the plunger into its loading position. Further movement of the plunger into glass in the parison mould is controlled by the position transducer until a predetermined pressure is met, and then is pressure controlled until the end of the up stroke. Plunger down air then effects a down stroke.

It will be understood that, by the provision of an appropriate positioning plate and clamping plate, the assembly can be modified for use with a single plunger operating cylinder, that is to say for single gob operation. The framework 2 as described only comprises three sets of pneumatic connections, and thus cannot be used for quadruple gob operation, but it can easily be seen how the principle of operation can be extended and an assembly comprising four sets of pneumatic connections can be provided which, with appropriate positioning plates and clamping plates, can be adapted for quadruple, triple, double or single gob operation. There is at present no requirement for five or more gob operation.

We claim:

1. A plunger assembly for use in a glassware forming machine comprising a base having a top surface having a center recess and a pair of outer recesses on either side of said center recess and conduit means for delivering counter blow air to each of said recesses, a replaceable positioning plate having a bottom surface to be placed on the top surface of said base to close said recesses, one, two or three plunger cylinders, each including tube means extending vertically downwardly therefrom into one of said recesses for receiving counter blow air, means for positioning each of said plunger cylinders on a top of said replaceable positioning plate with the axis of each of said tube means being selectively located, said replaceable positioning plate having a vertical recess for receiving each of said downwardly extending tube means, one of said outer recesses being selectively configured so that communication will be established from said conduit means via said one of said outer recesses to a plunger cylinder having said tube means communicating with said one of said outer recesses and having an axis located within a selected range of locations so that the plunger assembly can be changed from a plunger assembly having two plunger cylinders with the axes of said tube means having one spacing to a plunger assembly having two plunger cylinders having a different spacing of the axes of said tube means or the plunger assembly can be changed to a plunger assembly having only one plunger cylinder without changing said base and by changing the replaceable positioning plate or the plunger assembly can be changed to a plunger assembly having three plunger cylinders without changing said base and by changing the replaceable positioning plate.

2. A plunger assembly for use in a glassware forming machine according to claim 1, wherein the other one of said outer recesses is selectively configured so that communication will be established from said conduit means via the other one of said outer recesses to a plunger cylinder having tube means communicating with the other one of said outer recesses and having an axis located within a selected range of locations.

* * * * *